US010897328B2

United States Patent
Lin (10) Patent No.: US 10,897,328 B2
(45) Date of Patent: Jan. 19, 2021

(54) DATA INDICATING METHOD AND RELATED PRODUCTS

(71) Applicant: GUANGDONG OPPO MOBILE TELECOMMUNICATIONS CORP., LTD., Guangdong (CN)

(72) Inventor: Ya'nan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 30 days.

(21) Appl. No.: 16/288,023

(22) Filed: Feb. 27, 2019

(65) Prior Publication Data

US 2019/0199479 A1 Jun. 27, 2019

Related U.S. Application Data

(63) Continuation of application No. PCT/CN2017/092213, filed on Jul. 7, 2017.

(51) Int. Cl.
*H04L 1/06* (2006.01)
*H04L 5/00* (2006.01)
(Continued)

(52) U.S. Cl.
CPC .......... *H04L 1/0643* (2013.01); *H04L 1/1614* (2013.01); *H04L 1/1621* (2013.01);
(Continued)

(58) Field of Classification Search
CPC .......... H04L 29/06102; H04L 29/0653; H04L 29/0863; H04L 69/22; H04L 69/161;
(Continued)

(56) References Cited

U.S. PATENT DOCUMENTS

| 2017/0201960 | A1* | 7/2017 | Park | G01S 5/0236 |
| 2018/0278368 | A1* | 9/2018 | Kim | H04L 1/0043 |
| 2019/0020445 | A1* | 1/2019 | Kim | H04L 1/0067 |

FOREIGN PATENT DOCUMENTS

| CN | 101682470 A | 3/2010 |
| CN | 102571298 A | 7/2012 |

(Continued)

OTHER PUBLICATIONS

The First Office Action of corresponding Chinese application No. 201780050720.0, dated Mar. 11, 2020.
(Continued)

*Primary Examiner* — Ashley Shivers
(74) *Attorney, Agent, or Firm* — Ladas & Parry, LLP (57) ABSTRACT

Embodiments of the present disclosure disclose a data indicating method and related products, including: receiving, by a terminal, a downlink control signaling from a network side device, where the downlink control signaling includes a first information domain and a second information domain, the first information domain is configured to indicate whether a transport block scheduled by the downlink control signaling is a new transport block, and the second information domain is configured to indicate a coding block group scheduled by the downlink control signaling; determining, by the terminal, a number of coding block groups included in the new transport block according to the first information domain and the second information domain. The embodiments of the disclosure is beneficial to determine a number of bits of an uplink control signaling that is fed back and reduce an uplink control signaling overhead.

17 Claims, 7 Drawing Sheets

(51) Int. Cl.
*H04L 1/16* (2006.01)
*H04L 1/18* (2006.01)
*H04W 72/04* (2009.01)

(52) U.S. Cl.
CPC .......... *H04L 1/1896* (2013.01); *H04L 5/0055* (2013.01); *H04W 72/042* (2013.01); *H04L 1/1607* (2013.01)

(58) Field of Classification Search
CPC ... H04L 1/0643; H04L 1/1896; H04L 5/0055; H04L 1/1621; H04L 1/1614; H04L 1/1607; H04W 72/042
See application file for complete search history.

(56) References Cited

FOREIGN PATENT DOCUMENTS

| | | |
|---|---|---|
| CN | 103888229 A | 6/2014 |
| CN | 104113924 A | 10/2014 |
| RU | 2580795 C2 | 4/2016 |
| WO | 2011105810 A2 | 9/2011 |
| WO | 2012150793 A2 | 11/2012 |
| WO | 2015114525 A1 | 8/2015 |
| WO | 2016032293 A1 | 3/2016 |
| WO | 2019006742 A1 | 1/2019 |

OTHER PUBLICATIONS

International Search Report for PCT/CN2017/092213 dated Apr. 12, 2018 and its English translation provided by WIPO.
Written Opinion of the International Search Authority for PCT /CN2017/092213 dated Apr. 12, 2018 and its English translation provided by Google Translate.
Extended European Search Report dated Sep. 20, 2019; Appln. No. 17916699.6.
LG Electronics: "Consideration on DCI signaling for CBG based HARQ", R1-1710330 NR CBG Retransmission Final, 3rd Generation Partnership Project (3GPP), Mobile Competence Centre; 650, Route Des Lucioles; F-06921 Sophia-Antipolis Cedex; France; vol. RAN WG1, No. Qingdao, P.R.China; Jun. 27, 2017-Jun. 30, 2017; Jun. 26, 2017(Jun. 26, 2017).
Fujitsu: Disussion on DL control signaling related to CBG HARO Final, 3rd Generation Partnership Project (3GPP), Mobile Competence Centre; 650, Route Des Lucioles; F-06921 Sophia-Antipolis Cedex; France; vol. RAN WG1, No. Qingdao, P.R.China; Jun. 27, 2017-Jun. 30, 2017 Jun. 26, 2017 (Jun. 26, 2017).
The First Office Action of corresponding European application No. 17916699.6, dated Jun. 25, 2020.
LG Electronics: "Consideration on CB group based HARQ operation", 3GPP Draft; R1-1707661 NR CBG Retransmission_Final, 3rd Generation Partnership Project(3GPP), No. Hangzhou; May 15, 2017-May 19, 2017 May 14, 2017(May 14, 2017).
3GPP TSG RAN WG1 Meeting #89 R1-1709148; [88b-13] Summary Email discussion on: "CBG based retransmission, Transmission/ retransmission of preempted data before/after ACK NACK feedback, Preemption indication for NR" Hangzhou, China, May 15-19, 2017.
3GPP TSG RAN WG1 #89 R1-1709509; Proposals from discussion Tuesday's offline on CBG, Hangzhou, P.R. China, May 15-19, 2017.
The first Office Action of corresponding Russian application No. 2019135942 dated Oct. 13, 2020.

\* cited by examiner

DATA INDICATING METHOD AND RELATED PRODUCTS

CROSS-REFERENCE TO RELATED APPLICATION

This application is a continuation application of PCT Application No. PCT/CN2017/092213 filed on Jul. 7, 2017, the disclosure of which is incorporated herein by reference in its entirety.

TECHNICAL FIELD

The present disclosure relates to the field of communication technologies and, in particular, to a data indicating method and related products.

BACKGROUND

The 5th-generation mobile communication technology (5th-Generation, 5G) New Radio (NR) is a newly proposed issue in 3rd Generation Partnership Project (3GPP) organization. As a discussion on the new generation of 5G technology gradually deepens, on the one hand, since a communication system is backward compatible, a new technology developed later tends to be compatible with a previously standardized technology; on the other hand, since there are already a large number of existing designs in the 4th Generation mobile communication (4G) Long Term Evolution (LTE), in order to achieve compatibility, it will inevitably sacrifice a lot of flexibility of 5G, thereby reducing the performance. Therefore, there are currently two parallel research directions in the 3GPP organization, where a technical discussion group that does not consider backward compatibility is referred to as the 5G NR.

In a LTE system, a Transport Block (TB) refers to a data block including a Media Access Control (MAC) Protocol Data Unit (PDU), and this data block will be transmitted on a Transmission Time Interval (TTI), and is also a unit for data retransmission in a Hybrid Automatic Repeat Request (HARQ). In the LTE system, New Data Indication (NDI) signaling in a downlink control signaling is used to indicate whether a currently scheduled transport block is new data. If the currently scheduled transport block is new data, a value in a NDI information domain is inverted. That is, when a value of a NDI corresponding to a latest scheduled transport block before the currently scheduled transport block is 1, the NDI is inverted to 0 if the current schedule is new data, and the NDI is still 1 if it is retransmitted data. Since the NDI adopts an inverting setting method, a terminal can only determine that the currently scheduled transport block is new data compared to a last scheduled transport block, and cannot accurately know whether the currently received transport block is transmitted for the first time.

Currently in the 5G NR system, it is determined to support coding block group based feedback and retransmission for improving transmission efficiency, where one coding block group includes at least one coding block, and one transport block includes at least one coding block group. A sending end only needs to retransmit a coding block in a coding block group that fails to be decoded, and does not need to retransmit the entire transport block, and a base station can dynamically indicate a number of coding block groups included in one transport block through a downlink control signaling, and it is a problem of how to dynamically indicating the coding block group in the downlink control signaling that needs to be solved.

SUMMARY

Embodiments of the present disclosure provide a data indicating method and related products, so as to determine a number of bits of an uplink control signaling that is fed back, and reduce an uplink control signaling overhead.

In a first aspect, an embodiment of the present disclosure provides a data indicating method, including:

receiving, by a terminal, a downlink control signaling from a network side device, where the downlink control signaling includes a first information domain and a second information domain, the first information domain is configured to indicate whether a transport block scheduled by the downlink control signaling is a new transport block, and the second information domain is configured to indicate a coding block group scheduled by the downlink control signaling;

determining, by the terminal, a number of coding block groups included in the new transport block according to the first information domain and the second information domain.

In a second aspect, an embodiment of the present disclosure provides a data indicating method, including:

sending, by a network side device, a downlink control signaling to a terminal, where the downlink control signaling includes a first information domain and a second information domain, the first information domain is configured to indicate whether a transport block scheduled by the downlink control signaling is a new transport block, and the second information domain is configured to indicate a coding block group scheduled by the downlink control signaling;

indicating, by the network side device, a number of coding block groups included in the new transport block by the first information domain and the second information domain.

In a third aspect, an embodiment of the present disclosure provides a terminal, the terminal has a function of implementing behaviors of the terminal in the above method design. The function may be implemented by hardware or by corresponding software implemented by hardware. The hardware or software includes one or more modules corresponding to the function described above.

In a possible design, the terminal includes a processor configured to support the terminal to perform a corresponding function of the above method. Further, the terminal may further include a transceiver configured to support communication between the terminal and a network side device. Further, the terminal may further include a memory for coupling with the processor, and storing program instructions and data necessary for the terminal.

In a fourth aspect, an embodiment of the present disclosure provides a network side device, the network side device has a function of implementing behaviors of the network side device in the above method design. The function may be implemented by hardware or by corresponding software implemented by hardware. The hardware or software includes one or more modules corresponding to the function described above.

In a possible design, the network side device includes a processor configured to support the network side device to perform a corresponding function in the above method. Further, the network side device may further include a transceiver configured to support communication between the network side device and the terminal. Further, the network side device may further include a memory for coupling with the processor, and storing program instructions and data necessary for the network side device.

In a fifth aspect, an embodiment of the present disclosure provides a terminal, including a processor, a memory, a communication interface and one or more programs, where the one or more programs are stored in the memory and configured to be executed by the processor, the programs include instructions for performing the steps of any of the methods of the first aspect of the embodiments of the present disclosure.

In a sixth aspect, an embodiment of the present disclosure provides a network side device, including a processor, a memory, a transceiver and one or more programs, where the one or more programs are stored in the memory and configured to executed by the processor, the programs include instructions for performing the steps of any of the methods of the second aspect of the embodiments of the present disclosure.

In a seventh aspect, an embodiment of the present disclosure provides a computer readable storage medium, where the computer readable storage medium stores a computer program for electronic data exchange, and where the computer program causes a computer to perform some or all of the steps described in any of the methods of the first aspect of the embodiments of the present disclosure.

In an eighth aspect, an embodiment of the present disclosure provides a computer readable storage medium, where the computer readable storage medium stores a computer program for electronic data exchange, and where the computer program causes a computer to perform some or all of the steps described in any of the methods of the second aspect of the embodiments of the present disclosure.

In a ninth aspect, an embodiment of the present disclosure provides a computer program product, where the computer program product includes a non-transitory computer readable storage medium storing a computer program, the computer program is operative to cause a computer to execute some or all of the steps described in any of the methods of the first aspect of the embodiments of the disclosure. The computer program product can be a software installation package.

In a tenth aspect, an embodiments of the present disclosure provides a computer program product, where the computer program product includes a non-transitory computer readable storage medium storing a computer program, the computer program is operative to cause a computer to execute some or all of the steps described in any of the methods of the second aspect of the embodiments of the disclosure. The computer program product can be a software installation package.

It can be seen that, in the embodiments of the present disclosure, the terminal first receives the downlink control signaling from the network side device, where the downlink control signaling includes the first information domain and the second information domain, the first information domain is configured to indicate whether the transport block scheduled by the downlink control signaling is a new transport block, and the second information domain is configured to indicate the coding block group scheduled by the downlink control signaling; and then, determines the number of the coding block groups included in the new transport block according to the first information domain and the second information domain. It can be seen that, the number of the coding block groups in the scheduled new transport block can be determined according to the first information domain and the second information domain in the downlink control signaling, and the terminal device is enabled to achieve determination of the number of bits of the uplink control signaling that is fed back based on the number of the coding block groups, which is beneficial to reduce an uplink control signaling overhead.

BRIEF DESCRIPTION OF DRAWINGS

The drawings to be used in descriptions of the embodiments or the prior art will be briefly described below.

DESCRIPTION OF EMBODIMENTS

Technical solutions in the embodiments of the present disclosure will be described below with reference to the accompanying drawings.

Figure 1:
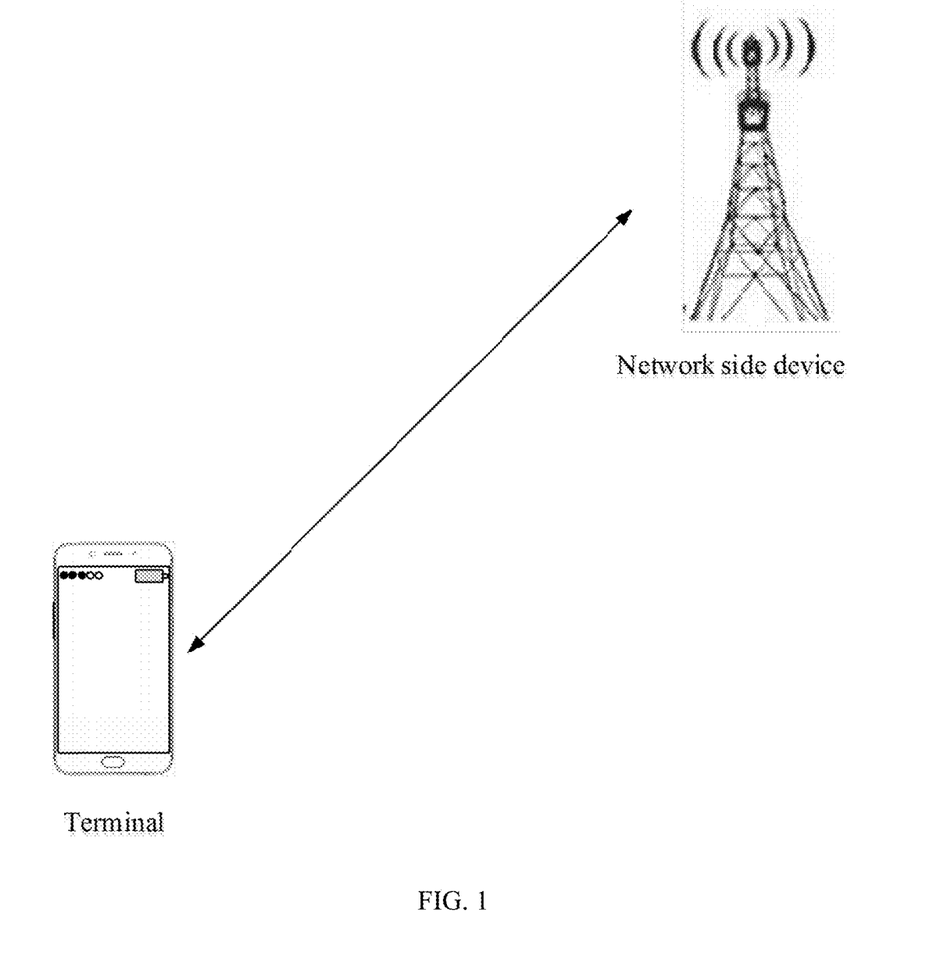
FIG. 1 is a network architecture diagram of a possible communication system according to an embodiment of the present disclosure.

Referring to FIG. 1, FIG. 1 is a possible network architecture of an example communication system according to an embodiment of the present disclosure. The example communication system may be, for example, a Global System for Mobile communications (GSM), a Code Division Multiple Access (CDMA) system, a Time Division Multiple Access (TDMA) system, Wideband Code Division Multiple Access (WCDMA) system, Frequency Division Multiple Access (FDMA) system, Orthogonal Frequency-Division Multiple Access (OFDMA) system, single carrier FDMA (SC-FDMA) system, General Packet Radio Service (GPRS) system, LTE system, 5G NR system and other such kind of communication systems. The example communication system specifically includes a network side device and a terminal, when the terminal accesses a mobile communication network provided by the network side device, a communication connection mode between the terminal and the network side device can be through a wireless link, and a communication connection mode can be a single connection mode or a dual-connection mode or a multi-connection mode. When the communication connection mode is the single-connection mode, the network-side device may be an LTE base station or an NR base station (also referred to as a gNB base station), when the communication connection mode is the dual-connection mode (specifically, it can be implemented by carrier aggregation (CA) technology, or implemented by multiple network side devices), and the terminal is connected to multiple network side devices, the multiple network side devices may be a primary base station master cell group (MCG) and a secondary base station secondary cell group (SCG), and the base stations perform data backhaul through a backhaul link, the primary base station may be an LTE base station, and the secondary base station may be an LTE base station, or the primary base station may be an NR base station, and the secondary base station may be an LTE base station, or the primary base station may be an NR base station, and the secondary base station may be an NR base station.

In the embodiments of the present disclosure, the terms "network" and "system" are often used interchangeably, and those skilled in the art can understand the meaning thereof. The terminal involved in the embodiments of the present disclosure may include various handheld devices, in-vehicle devices, wearable devices, computing devices, or other processing devices connected to a wireless modem, all of which has a wireless communication function, and User Equipment (UE), Mobile Station (MS), terminal device of various forms, and the like. For convenience of description, the devices mentioned above are collectively referred to as a terminal.

Figure 2A:
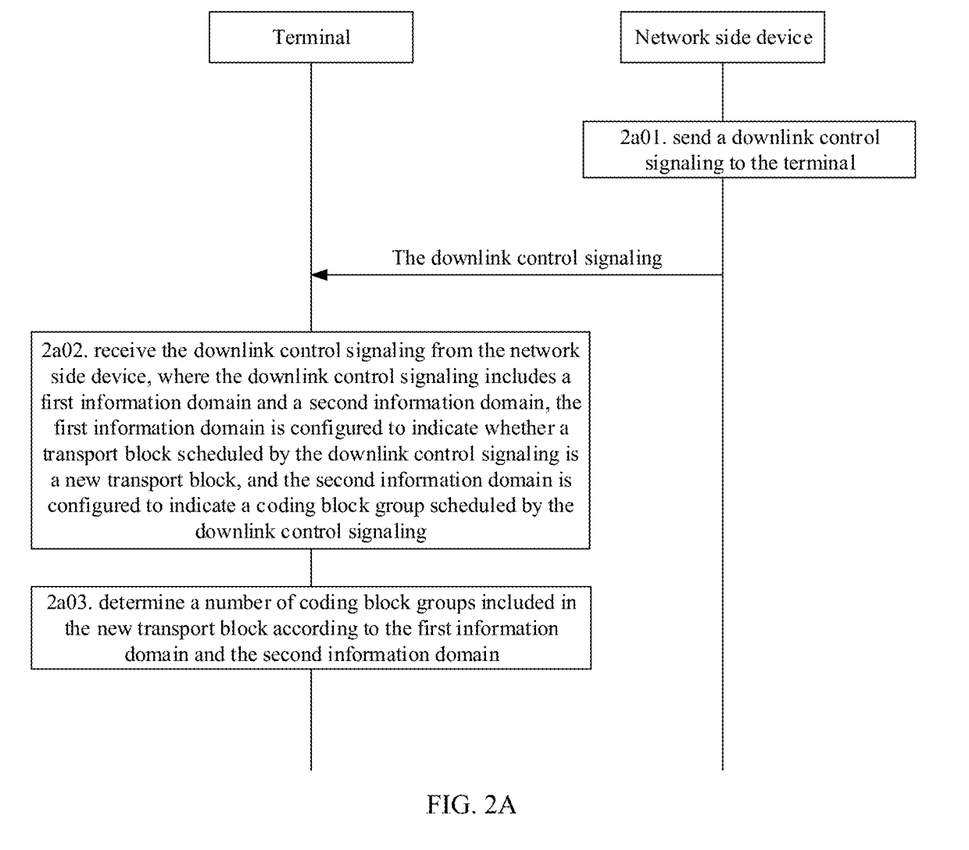
FIG. 2A is a schematic flowchart of a data indicating method according to an embodiment of the present disclosure.

Referring to FIG. 2A, FIG. 2A is a data indicating method according to an embodiment of the present disclosure, the method includes:

in part 2a01, a network side device sends a downlink control signaling to a terminal.

in part 2a02, the terminal receives the downlink control signaling from the network side device, where the downlink control signaling includes a first information domain and a second information domain, the first information domain is configured to indicate whether a transport block scheduled by the downlink control signaling is a new transport block, and the second information domain is configured to indicate a coding block group scheduled by the downlink control signaling.

The first information domain and the second information domain are further configured to indicate a number of coding block groups included in the new transport block.

The new transport block specifically includes the following two cases:

1. the new transport block is a transport block sent by the base station for the first time; and 2. the new transport block is different from a previous transport block of the new transport block.

The new transport block being different from the previous transport block of the new transport block is specifically that data information included in the new transport block is different from data information included in the previous transport block.

The second information domain being configured to indicate the coding block group scheduled by the downlink control signaling specifically includes the following two cases:

1. the second information domain is configured to indicate the number of the coding block groups scheduled by the downlink control signaling;

2. the second information domain is configured to indicate whether a scheduling resource corresponding to the downlink control signaling carries the coding block group.

The transport block scheduled by the downlink control signaling includes at least one coding block group, and the coding block group includes at least one coding block. A division strategy of the coding block group in the transport block may be a random division strategy, a data volume equalization division strategy, or a division policy based on a specific service requirement, etc., and the division strategy of the coding block group in a preset transport block is not limited in the embodiments of the present disclosure.

In part 2a03, the terminal determines a number of coding block groups included in the new transport block according to the first information domain and the second information domain.

It can be seen that, in the embodiments of the present disclosure, the terminal first receives the downlink control signaling from the network side device, where the downlink control signaling includes the first information domain and the second information domain, the first information domain is configured to indicate whether the transport block scheduled by the downlink control signaling is a new transport block, and the second information domain is configured to indicate the coding block group scheduled by the downlink control signaling; and then, determines the number of the coding block groups included in the new transport block according to the first information domain and the second information domain. It can be seen that, the number of the coding block groups in the scheduled new transport block can be determined according to the first information domain and the second information domain in the downlink control signaling, and the terminal device is enabled to achieve determination of a number of bits of an uplink control signaling that is fed back based on the number of the coding block groups, which is beneficial to reduce an uplink control signaling overhead.

In a possible example, the second information domain indicates the coding block group scheduled by the downlink control signaling in a Bitmap manner.

A bit length of the second information domain is agreed by a protocol or configured by a network device.

In a possible example, the terminal determines the number of the coding block groups included in the new transport block according to the first information domain and the second information domain, includes:

the terminal determines that the transport block scheduled by the downlink control signaling is a new transport block according to the first information domain;

the terminal determines that values of first K bits in the second information domain are all a preset value or values of last K bits in the second information domain are all the preset value, where K is a positive integer;

the terminal determines that the number of the coding block groups included in the new transport block is K.

The preset value may be 1 or 0. When the values of the first K bits in the second information domain are all 1 or 0 or the values of the last K bits in the second information domain are all 1 or 0, the number of the coding block groups included in the new transport block is K.

For example, the preset value is 1, when the second information domain is {1,1,1,0}, it indicates that there are three coding block groups in the new transport block, where a value of 1 indicates that the scheduling resource contains a coding block group to be transmitted, and a value of 0 indicates that the scheduling resource has no coding block group to be transmitted.

It can be seen that, in this example, the terminal determines the number of the coding block groups according to the preset value in the second information domain, which is beneficial to improve a convenience of determining the number of the bits of the uplink control signaling that is fed back.

In this possible example, after the terminal determines the number of the coding block groups included in the new transport block according to the first information domain and the second information domain, the method further includes:

the terminal sends acknowledgment (ACK) or non-acknowledgment (NACK) information for K bits of the new transport block to the network side device.

It can be seen that, in this example, when determining the number of the coding block groups included in the new transport block, the terminal sends acknowledgement/non-acknowledgement (ACK/NACK) information for the K bits of the transport block to the network side device, which is beneficial for the network side device to determine whether a transmission of the transport block is completed or whether a retransmission is needed, which is beneficial to improve an integrity of a mobile communication system.

In a possible example, the first information domain is a New Data Indication (NDI) information domain.

A specific implementation manner for the terminal to determine that the transport block scheduled by the downlink control signaling is a new transport block according to the first information domain may be that:

when a value of the first information domain is 1 and a value of a first information domain in a downlink control signaling scheduling a previous transport block of the transport block is 0, the terminal determines that the transport block scheduled by the downlink control signaling is a new transport block;

when the value of the first information domain is 0 and the value of the first information domain in the downlink control signaling scheduling the previous transport block of the transport block is 1, the terminal determines that the transport block scheduled by the downlink control signaling is a new transport block.

In a possible example, the method further includes:

the terminal determines that the transport block scheduled by the downlink control signaling is a new transport block according to the first information domain;

the terminal determines that values of first K bits in the second information domain are not all a preset value or values of last K bits in the second information domain are not all the preset value; and the terminal does not send ACK/NACK information for the new transport block to the network side device.

For example, the preset value is 1, and when the second information domain is {0,1,0}, the values of the first K bits are not all 1 or the values of the last K bits is not all 1, the terminal does not send the ACK/NACK information for the new transport block to the network side device.

Figure 2B:
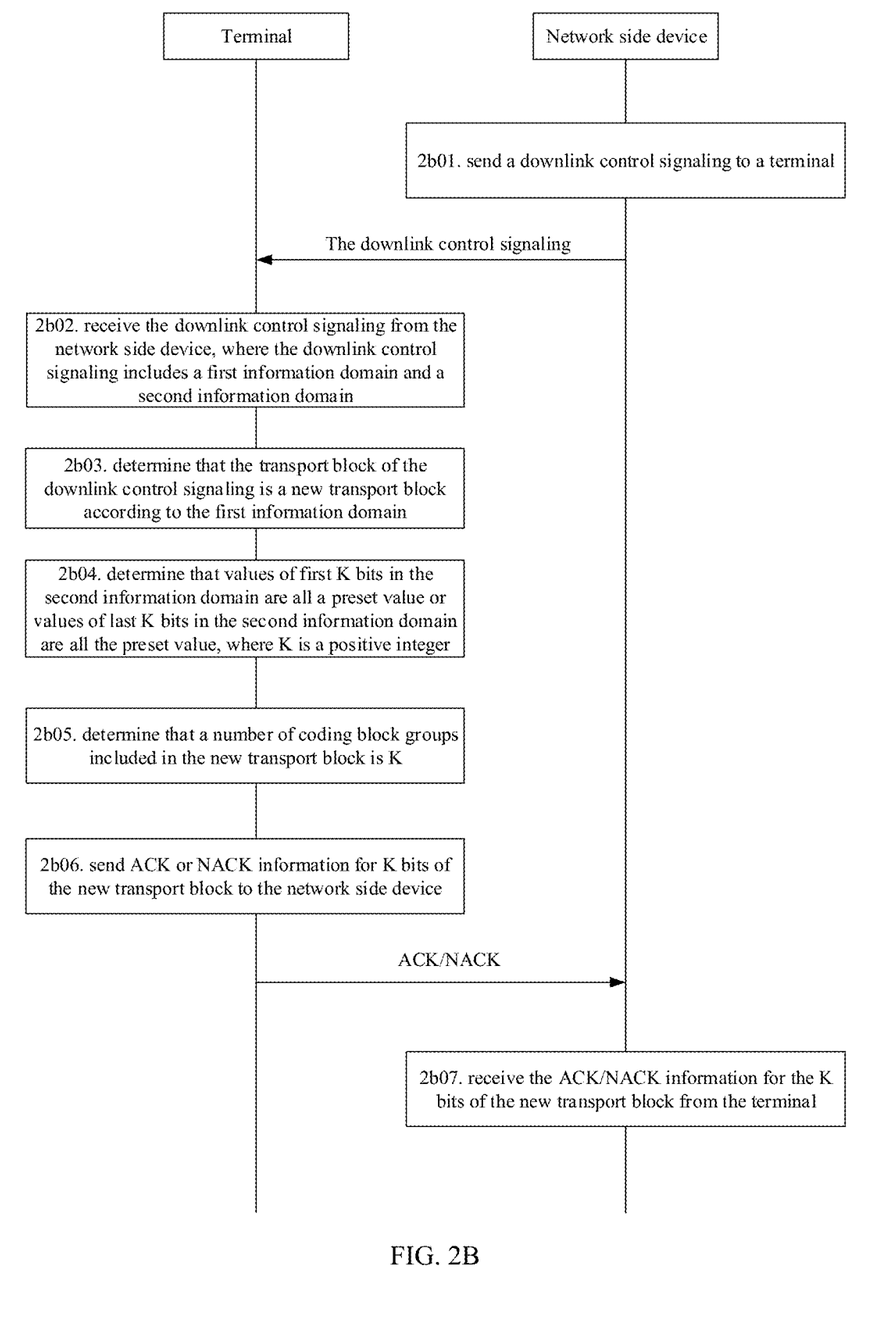
FIG. 2B is a schematic flowchart of another data indicating method according to an embodiment of the present disclosure.

Consistent with the embodiment in FIG. 2A, referring to FIG. 2B, FIG. 2B is another data indicating method according to an embodiment of the present disclosure, the method includes:

in part 2b01, the network side device sends a downlink control signaling to a terminal;

in part 2b02, the terminal receives the downlink control signaling from the network side device, where the downlink control signaling includes a first information domain and a second information domain;

in part 2b03, the terminal determines that the transport block of the downlink control signaling is a new transport block according to the first information domain;

in part 2b04, the terminal determines that values of first K bits in the second information domain are all a preset value or values of last K bits in the second information domain are all the preset value, where K is a positive integer;

in part 2b05, the terminal determines that a number of a coding block groups included in the new transport block is K;

in part 2b06, the terminal sends ACK or NACK information for K bits of the new transport block to the network side device;

in part 2b07, the network side device receives the ACK/NACK information for the K bits of the new transport block from the terminal.

It can be seen that, in the embodiments of the present disclosure, the terminal first receives the downlink control signaling from the network side device, where the downlink control signaling includes the first information domain and the second information domain, the first information domain is configured to indicate whether the transport block scheduled by the downlink control signaling is a new transport block, and the second information domain is configured to indicate the coding block group scheduled by the downlink control signaling; and then, determines the number of the coding block groups included in the new transport block according to the first information domain and the second information domain. It can be seen that, the number of the coding block groups in the scheduled new transport block can be determined according to the first information domain and the second information domain in the downlink control signaling, and the terminal device is enabled to achieve determination of a number of bits of an uplink control signaling that is fed back based on the number of the coding block groups, which is beneficial to reduce an uplink control signaling overhead.

The embodiments of the present disclosure will be specifically described below with reference to a specific application scenario.

Figure 3:
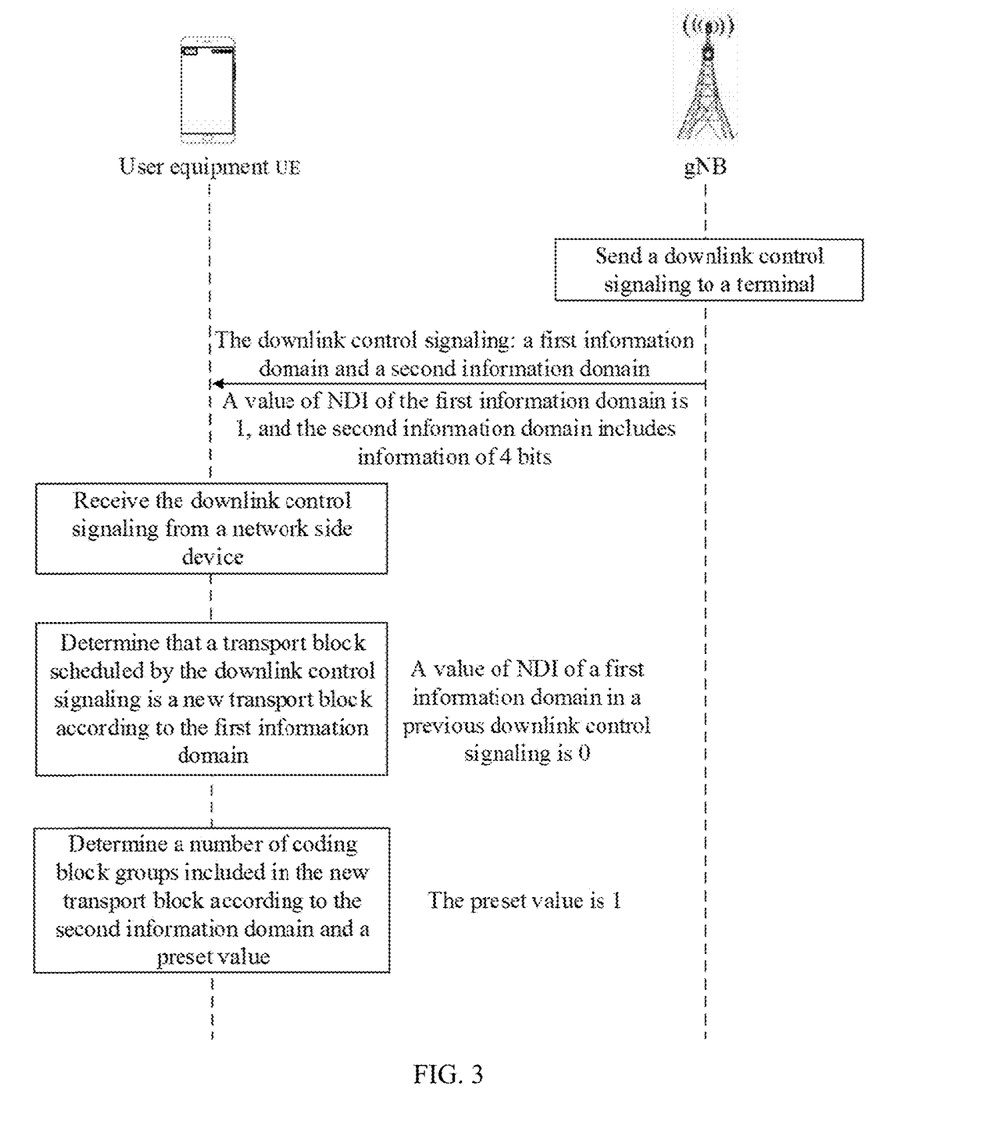
FIG. 3 is a schematic diagram of a data indicating method in a 5G NR system scenario according to an embodiment of the present disclosure.

Referring to FIG. 3, the communication system is a 5G NR communication system, the network side device is a base station gNB in 5G NR, and the terminal is a user equipment UE in 5G NR, and data to be transmitted is decomposed into 10 coding blocks according to a preset protocol, the 10 coding blocks are divided into 4 coding block groups for indicating corresponding transmission resources, the 4 coding block groups are encapsulated in a transport block, and the UE receives a downlink control signaling sent by the gNB for scheduling the transport block, where the downlink signaling includes a first information domain and a second information domain, NDI of the first information domain is 1, and the second information domain includes information of 4 bits for indicating a coding block group scheduled by the downlink control signaling, a preset value is 1. The terminal, when detecting that a value of a NDI of a first information domain in a downlink control signaling that schedules a previous transport block of the transport block is 0, determines that the transport block is a new transport block, and then, determines a coding block group included in the new transport block according to the second information domain:

when the second information domain is {1,1,1,1}, it indicates that the new transport block includes 4 coding block groups;

when the second information domain is {1,1,1,0} or {0,1,1,1}, it indicates that the new transport block includes three coding block groups;

when the second information domain is {1,1,0,0} or {0,0,1,1}, it indicates that the new transport block includes two coding block groups; and when the second information domain is {1,0,0,0} or {0,0,0,1}, it indicates that the new transport block includes one coding block group.

Figure 4:
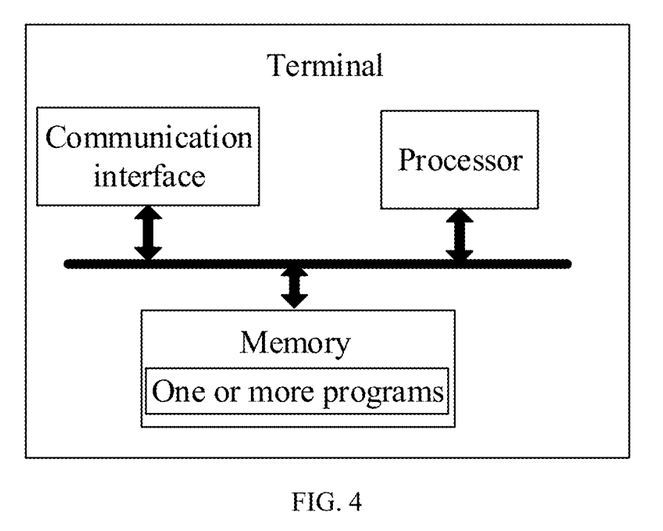
FIG. 4 is a schematic structural diagram of a terminal according to an embodiment of the present disclosure.

Consistent with the embodiment in FIG. 2A, referring to FIG. 4, FIG. 4 is a schematic structural diagram of a terminal according to an embodiment of the present disclosure. As shown in the figure, the terminal includes a processor, a memory, a communication interface, and one or more programs, where the one or more programs are stored in the memory and configured to be executed by the processor, the programs include instructions for performing the following steps:

the terminal receives a downlink control signaling from a network side device, where the downlink control signaling includes a first information domain and a second information domain, the first information domain is configured to indicate whether a transport block scheduled by the downlink control signaling is a new transport block, and the second information domain is configured to indicate a coding block group scheduled by the downlink control signaling;

the terminal determines a number of coding block groups included in the new transport block according to the first information domain and the second information domain.

It can be seen that, in the embodiments of the present disclosure, the terminal first receives the downlink control signaling from the network side device, where the downlink control signaling includes the first information domain and the second information domain, the first information domain is configured to indicate whether the transport block scheduled by the downlink control signaling is a new transport block, and the second information domain is configured to indicate the coding block group scheduled by the downlink control signaling; and then, determines the number of the coding block groups included in the new transport block according to the first information domain and the second information domain. It can be seen that, the number of the coding block groups in the scheduled new transport block can be determined according to the first information domain and the second information domain in the downlink control signaling, and the terminal device is enabled to achieve determination of a number of bits of an uplink control signaling that is fed back based on the number of the coding block groups, which is beneficial to reduce an uplink control signaling overhead.

In a possible example, the second information domain indicates the coding block group scheduled by the downlink control signaling in a bitmap manner.

In a possible example, in an aspect of determining the number of the coding block groups included in the new transport block according to the first information domain and the second information domain, the instructions in the above program are specifically configured to perform the following steps: determining that the transport block scheduled by the downlink control signaling is a new transport block according to the first information domain; determining that values of first K bits in the second information domain are all a preset value or values of last K bits in the second information domain are all the preset value, where K is a positive integer; and determining that the number of the coding block groups included in the new transport block is K.

In this possible example, the program includes instructions for performing the following steps: after determining the number of the coding block groups included in the new transport block according to the first information domain and the second information domain, sending acknowledgment (ACK) or non-acknowledgment (NACK) information for K bits of the new transport block to the network side device.

In a possible example, the first information domain is a new data indication (NDI) information domain.

Figure 5:
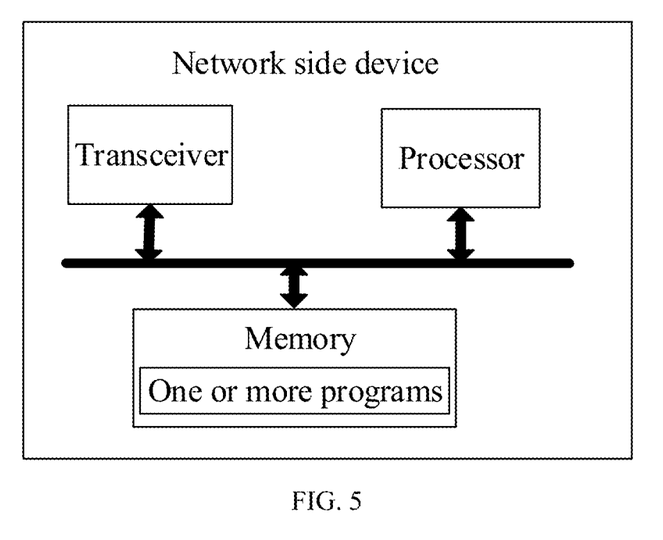
FIG. 5 is a schematic structural diagram of a network side device according to an embodiment of the present disclosure.

Consistent with the embodiment in FIG. 2A, referring to FIG. 5, FIG. 5 is a schematic structural diagram of a network side device according to an embodiment of the present disclosure. As shown in the figure, the network side device includes a processor, a memory, a transceiver and one or more programs, where the one or more programs are stored in the memory and configured to be executed by the processor, the programs include instructions for performing the following steps:

the network side device sending a downlink control signaling to a terminal, where the downlink control signaling includes a first information domain and a second information domain, the first information domain is configured to indicate whether a transport block scheduled by the downlink control signaling is a new transport block, and the second information domain is configured to indicate a coding block group scheduled by the downlink control signaling;

the network side device indicates a number of a coding block groups included in the new transport block by the first information domain and the second information domain.

It can be seen that, in the embodiment of the present disclosure, the network side device first sends the downlink control signaling to the terminal, where the downlink control signaling includes the first information domain and the second information domain, the first information domain is configured to indicate whether the transport block scheduled by the downlink control signaling is a new transport block, and the second information domain is configured to indicate the coding block group scheduled by the downlink control signaling; and then, indicates the number of the coding block groups included in the new transport block by the first information domain and the second information domain. It can be seen that, the number of the coding block groups in the scheduled new transport block can be indicated according to the first information domain and the second information domain in the downlink control signaling, and the terminal device is enabled to achieve determination of a number of bits of an uplink control signaling that is fed back based on the number of the coding block groups, which is beneficial to reduce an uplink control signaling overhead.

In a possible example, the second information domain indicates the coding block group scheduled by the downlink control signaling in a bitmap manner.

In a possible example, in an aspect of indicating the number of the coding block groups included in the new transport block by the first information domain and the second information domain, the instructions in the above program are specifically configured to perform the following steps: indicating that the transport block scheduled by the downlink control signaling is a new transport block by the first information domain; indicating that values of first K bits in the second information domain are all a preset value or values of last K bits in the second information domain are all the preset value, where K is a positive integer; and indicating that the number of the coding block groups included in the new transport block is K.

In this possible example, the program includes instructions for performing the following steps: after indicating the number of the coding block groups included in the new transport block by the first information domain and the second information domain, receiving acknowledgment (ACK) or non-acknowledgment (NACK) information for K bits of the new transport block sent by the terminal.

In a possible example, the first information domain is a new data indication (NDI) information domain.

The foregoing describes the solution of the embodiments of the present disclosure mainly from the perspective of interaction between network elements. It can be understood that, in order to implement the above functions, the terminal and the network side device include corresponding hardware structures and/or software modules for performing the respective functions. Those skilled in the art will readily appreciate that the present disclosure can be implemented in hardware or combination of hardware and computer software in combination with the units and algorithm steps of the various examples described in the embodiments disclosed herein. Whether a function is implemented in hardware or computer software driving hardware depends on the specific application and design constraints of the technical solution. Those skilled in the art can use different methods for implementing the described functions for each particular application, but such implementation should not be considered to be beyond the scope of the present disclosure.

The embodiments of the present disclosure may perform division of functional units on the terminal and the network side device according to the foregoing method. For example, each functional unit may be divided according to respective function, or two or more functions may be integrated into one processing unit. The above integrated unit can be implemented in the form of hardware or in the form of a software program module. It should be noted that the division of the unit in the embodiments of the present disclosure is exemplary, and is only a logical function division, and another division manner may be used in actual implementation.

Figure 6:
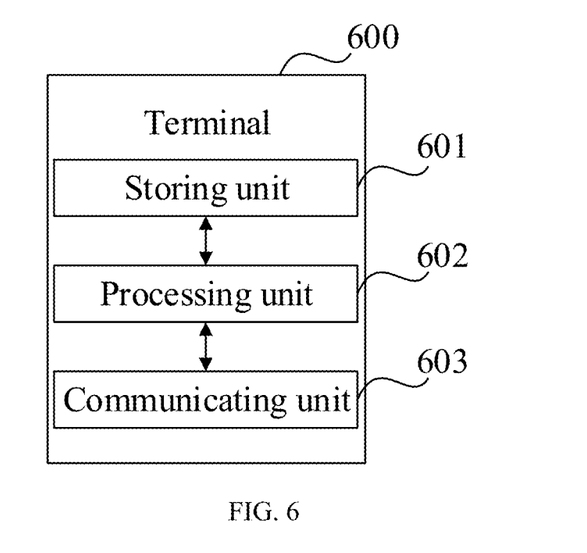
FIG. 6 is a block diagram of a functional unit of a terminal according to an embodiment of the present disclosure.

In the case of employing an integrated unit, FIG. 6 shows a block diagram of a possible functional unit of the terminal involved in the above embodiments. The terminal 600 includes a processing unit 602 and a communicating unit 603. The processing unit 602 is configured to perform control management on actions of the terminal. For example, the processing unit 602 is configured to support the terminal to perform steps 2*a*02-2*a*03 in FIG. 2A, steps 2*b*02-2*b*06 in FIG. 2B, and/or other processes of the techniques described herein. The communicating unit 603 is configured to support communication of the terminal with other devices, such as communication with the network side device shown in FIG. 5. The terminal may further include a storing unit 601 configured to store program codes and data of the terminal.

The processing unit 602 can be a processor or a controller, for example, a Central Processing Unit (CPU), a general-purpose processor, a Digital Signal Processor (DSP), an Application-Specific Integrated Circuit (ASIC), a Field Programmable Gate Array (FPGA) or other programmable logic devices, transistor logic devices, hardware components, or any combination thereof. It can implement or carry out various exemplary logical blocks, modules and circuits described in combination with the disclosure disclosed by the present disclosure. The processor may also be a combination for implementing computing functions, for example, a combination including one or more microprocessors, a combination of a DSP and a microprocessor, and the like. The communicating unit 603 may be a transceiver, a transceiver circuit, and the like, and the storing unit 601 may be a memory.

The processing unit 602 is configured to receive a downlink control signaling from a network side device using the communications unit, where the downlink control signaling includes a first information domain and a second information domain, the first information domain is configured to indicate whether a transport block scheduled by the downlink control signaling is a new transport block, and the second information domain is configured to indicate a coding block group scheduled by the downlink control signaling;

the processing unit is further configured to determine a number of a coding block groups included in the new transport block according to the first information domain and the second information domain.

In a possible example, the second information domain indicates the coding block group scheduled by the downlink control signaling in a Bitmap manner.

In a possible example, in an aspect of determining the number of the coding block groups included in the new transport block according to the first information domain and the second information domain, the processing unit is specifically configured to: determine that the transport block scheduled by the downlink control signaling is a new transport block according to the first information domain; determine that values of first K bits in the second information domain are all a preset value or values of last K bits in the second information domain are all the preset value, where K is a positive integer; and determine that the number of the coding block groups included in the new transport block is K.

In this possible example, the processing unit, after determining the number of the coding block groups included in the new transport block according to the first information domain and the second information domain, is further configured to: send, using the communications unit, acknowledgment (ACK) or non-acknowledgment (NACK) information for K bits of the new transport block to the network side device.

In a possible example, the first information domain is a new data indication (NDI) information domain.

When the processing unit 602 is a processor, the communicating unit 603 is a communication interface, and when the storing unit 601 is a memory, the terminal involved in the embodiment of the present disclosure may be the terminal shown in FIG. 4.

Figure 7:
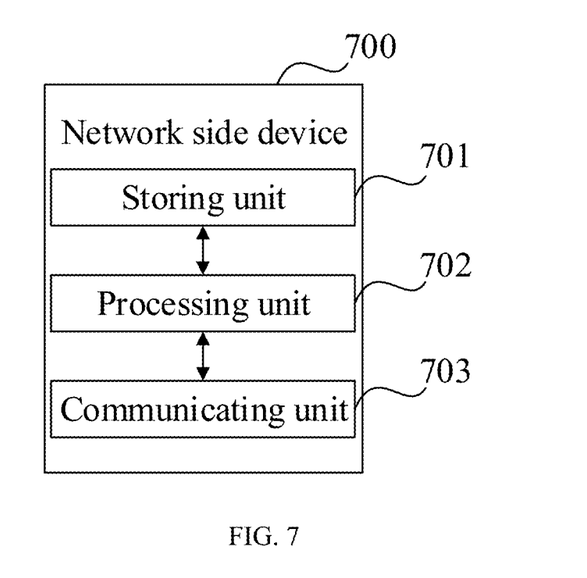
FIG. 7 is a block diagram of a functional unit of a network side device according to an embodiment of the present disclosure.

In the case of employing an integrated unit, FIG. 7 shows a block diagram of a possible functional unit of the network side device involved in the above embodiments. The network side device 700 includes a processing unit 702 and a communicating unit 703. The processing unit 702 is configured to perform control management on actions of the network side device. For example, the processing unit 702 is configured to support the network side device to perform step 2*a*01 in FIG. 2A, steps 2*b*01, 2*b*07 in FIG. 2B, and/or other processes of the technology described herein. The communicating unit 703 is configured to support communication of the network side device with other devices, such as communication with the terminal shown in FIG. 4. The network side device may further include a storing unit 701 for storing program codes and data of the network side device.

The processing unit 702 can be a processor or a controller, for example, a Central Processing Unit (CPU), a general-purpose processor, a Digital Signal Processor (DSP), an Application-Specific Integrated Circuit (ASIC), a Field Programmable Gate Array (FPGA) or other programmable logic devices, transistor logic devices, hardware components, or any combination thereof. It can implement or carry out various illustrative logical blocks, modules and circuits described in combination with the disclosure disclosed by the present disclosure. The processor may also be a combination for implementing computing functions, for example, a combination including one or more microprocessors, a combination of a DSP and a microprocessor, and the like. The communicating unit 703 may be a transceiver, a transceiver circuit, a radio frequency chip, and the like, and the storing unit 701 may be a memory.

The processing unit 702 is configured to send a downlink control signaling to a terminal using the communications unit, where the downlink control signaling includes a first information domain and a second information domain, the first information domain is configured to indicate whether a transport block scheduled by the downlink control signaling is a new transport block, and the second information domain is configured to indicate a coding block group scheduled by the downlink control signaling;

the processing unit is further configured to indicate a number of a coding block groups included in the new transport block by the first information domain and the second information domain.

In a possible example, the second information domain indicates the coding block group scheduled by the downlink control signaling in a Bitmap manner.

In a possible example, in an aspect of indicating the number of the coding block groups included in the new transport block by the first information domain and the second information domain, the processing unit is specifically configured to: indicate that the transport block scheduled by the downlink control signaling is a new transport block by the first information domain; indicate that values of first K bits in the second information domain are all a preset value or values of last K bits in the second information domain are all the preset value, where K is a positive integer; and indicate that the number of the coding block groups included in the new transport block is K.

In this possible example, the processing unit, after indicating the number of the coding block groups included in the new transport block by the first information domain and the second information domain, is further configured to: receive, using the communicating unit, acknowledgment (ACK) or non-acknowledgment (NACK) information for K bits of the new transport block sent by the terminal.

In a possible example, the first information domain is a new data indication (NDI) information domain.

When the processing unit 702 is a processor, the communicating unit 703 is a communication interface, and when the storing unit 701 is a memory, the network side device involved in the embodiments of the present disclosure may be the network side device shown in FIG. 5.

Figure 8:
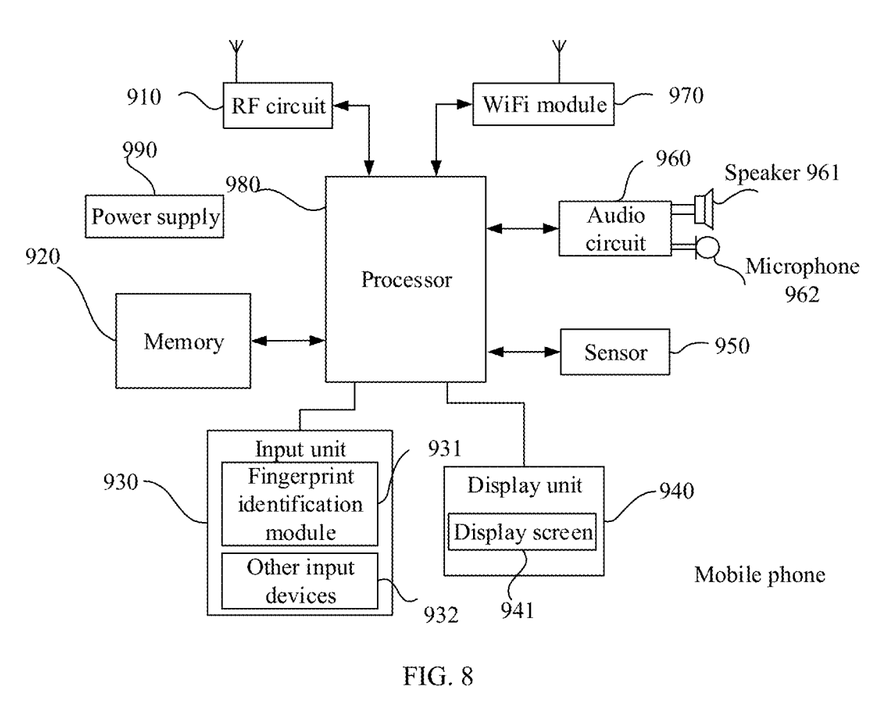
FIG. 8 is a schematic structural diagram of another terminal according to an embodiment of the present disclosure.

An embodiment of the present disclosure further provides another terminal. As shown in FIG. 8, for the convenience of description, only parts related to the embodiments of the present disclosure are shown, for the specific technical details that are not disclosed, please refer to the method portion of the embodiments of the present disclosure. The terminal may be any terminal device including a mobile phone, a tablet computer, a PDA (Personal Digital Assistant), a POS (Point of Sales), an in-vehicle computer, and the case where the terminal is a mobile phone is taken as an example:

FIG. 8 shows a block diagram showing a partial structure of a mobile phone related to the terminal provided by the embodiments of the present disclosure. Referring to FIG. 8, the mobile phone includes components such as a Radio Frequency (RF) circuit 910, a memory 920, an input unit 930, a display unit 940, a sensor 950, an audio circuit 960, a Wireless Fidelity (WiFi) module 970, a processor 980, and a power supply 990, and the like. It will be understood by those skilled in the art that the structure of the mobile phone shown in FIG. 8 does not constitute a limitation to the mobile phone, and may include more or less components than those illustrated, or some components may be combined, or component arrangements are different.

The following describes the components of the mobile phone in detail with reference to FIG. 8:

The RF circuit 910 can be configured to receive and sending information. Generally, the RF circuit 910 includes, but is not limited to, an antenna, at least one amplifier, a transceiver, a coupler, a Low Noise Amplifier (LNA), a duplexer, and the like. In addition, the RF circuit 910 can also communicate with the network and other devices via wireless communication. The above wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS), and the like.

The memory 920 can be configured to store software programs and modules, and the processor 980 executes various functional applications and data process of the mobile phone by running the software programs and modules stored in the memory 920. The memory 920 may mainly include a storage program area and a storage data area, where the storage program area may store an operating system, an application required for at least one function, and the like; the storage data area may store data created according to usage of the mobile phone, and the like. Moreover, the memory 920 can include a high speed random access memory, and can also include a non-volatile memory, such as at least one magnetic disk storage device, flash memory device, or other volatile solid state storage devices.

The input unit 930 can be configured to receive input numeric or character information and to generate key signal inputs related to user settings and function controls of the mobile phone. Specifically, the input unit 930 can include a fingerprint identification module 931 and other input devices 932. The fingerprint identification module 931 can collect fingerprint data of the user thereon. In addition to the fingerprint recognition module 931, the input unit 930 may also include other input devices 932. Specifically, other input devices 932 may include, but are not limited to, one or more of a touch screen, a physical keyboard, a function key (such as volume control button, switch button, etc.), a trackball, a mouse, a joystick, and the like.

The display unit 940 can be configured to display information input by the user or information provided to the user as well as various menus of the mobile phone. The display unit 940 can include a display screen 941. In an embodiment, the display screen 941 can be configured in the form of a Liquid Crystal Display (LCD), an Organic Light-Emitting Diode (OLED), and the like. Although in FIG. 8, the fingerprint identification module 931 and the display screen 941 function as two separate components to implement the input and input functions of the mobile phone, in some embodiments, the fingerprint recognition module 931 and the display screen 941 can be integrated to achieve the input and play functions of the mobile phone.

The mobile phone may also include at least one type of sensor 950, such as a light sensor, a motion sensor, and other sensors. Specifically, the light sensor may include an ambient light sensor and a proximity sensor, where the ambient light sensor may adjust a brightness of the display screen 941 according to the brightness of the ambient light, and the proximity sensor may turn off the display screen 941 and/or backlight when the mobile phone moves to the ear. As a kind of motion sensor, an accelerometer sensor can detect the magnitude of acceleration in all directions (usually three axes), it can detect the magnitude and direction of gravity when it is stationary. It can be used to identify the application of the gesture of the mobile phone (such as horizontal and vertical screen switching, related game, magnetometer attitude calibration), vibration recognition related functions (such as pedometer, tapping), etc.; as for gyroscopes, barometers, hygrometers, thermometers, infrared sensors and other sensors that the mobile phone can also be configured with, they will not be repeated herein.

An audio circuit 960, a speaker 961, and a microphone 962 can provide an audio interface between the user and the mobile phone. The audio circuit 960 can transmit a converted electrical data converted from the received audio data to the speaker 961 for conversion to the sound signal for playing by the speaker 961; on the other hand, the microphone 962 converts a collected sound signal into an electrical signal, and it is converted into audio data after being received by the audio circuit 960, and the audio data is then played to the processor 980 for processing, and sent to another mobile phone via the RF circuit 910, or played to the memory 920 for further processing.

WiFi belongs to a short-range wireless transmission technology, and the mobile phone can help users to send and receive e-mails, browse web pages, and access streaming media through the WiFi module 970, which provides wireless broadband Internet access to the user. Although FIG. 8 shows the WiFi module 970, it can be understood that it does not belong to an essential configuration of the mobile phone, and may be omitted as needed without changing the scope of the essence of the disclosure.

The processor 980 is a control center of the mobile phone, which connects each portion of the entire mobile phone using various interfaces and lines, various functions and data processing of the mobile phone can be performed by running or executing software programs stored in the memory 920 and/or modules, and invoking data stored in the memory 920, so that the overall monitoring of the mobile phone can be achieved. In an embodiment, the processor 980 may include one or more processing units; preferably, the processor 980 may integrate an application processor and a modem processor, where the application processor primarily processes an operating system, a user interface, an application, and the like. The modem processor primarily processes wireless communications. It will be appreciated that the above described modem processor may also not be integrated into the processor 980.

The mobile phone further includes a power source 990 (such as a battery) that supplies power to the components thereof. Preferably, the power source can be logically coupled to the processor 980 through a power management system to achieve management functions such as charging, discharging, and power management through the power management system.

Although not shown, the mobile phone may further includes a camera, a Bluetooth module, and the like, and details are not described herein again.

In the foregoing embodiments shown in FIG. 2A-2B, the process on the terminal side in each step method can be implemented based on the structure of the mobile phone.

In the foregoing embodiments shown in FIG. 4 and FIG. 5, each unit function can be implemented based on the structure of the mobile phone.

An embodiment of the present disclosure also provides a computer readable storage medium, where the computer readable storage medium stores a computer program for electronic data exchange, and where the computer program causes a computer to perform some or all of the steps described by the terminal in the above method embodiments.

An embodiment of the present disclosure also provides a computer readable storage medium, where the computer readable storage medium stores a computer program for electronic data exchange, and where the computer program causes a computer to perform some or all of the steps described by the network side device in the above method embodiments.

An embodiment of the disclosure further provides a computer program product, where the computer program product includes a non-transitory computer readable storage medium storing a computer program, the computer program is operative to cause a computer to execute some or all of the steps described by the terminal in the above method embodiments. The computer program product can be a software installation package.

An embodiment of the present disclosure also provides a computer program product, where the computer program product includes a non-transitory computer readable storage medium storing a computer program, the computer program is operative to cause a computer to execute some or all of the steps described by the network side device in the above method embodiments. The computer program product can be a software installation package.

The steps of the method or algorithm described in the embodiments of the present disclosure may be implemented in a hardware manner, or may be implemented by a processor executing software instruction manner. The software instruction may be composed of corresponding software modules, which may be stored in a Random Access Memory (RAM), a flash memory, a Read Only Memory (ROM), an Erasable Programmable ROM (EPROM), electrically erasable programmable ROM (EEPROM), registers, hard disk, removable hard disk, Compact Disk ROM (CD-ROM) or any other forms of storage medium known in the art. An exemplary storage medium is coupled to a processor to enable the processor to read information from, and write information to, the storage medium. Of course, the storage medium can also be an integral part of the processor. The processor and the storage medium can be located in an ASIC. Additionally, the ASIC can be located in an access network device, a target network device, or a core network device. Of course, the processor and the storage medium may also exist as discrete components in the access network device, the target network device, or the core network device.

Those skilled in the art should appreciate that in one or more of the above examples, the functions described in the embodiments of the present disclosure may be implemented in whole or in part by software, hardware, firmware, or any combination thereof. When implemented in software, it may be implemented in whole or in part in the form of a computer program product. The computer program product includes one or more computer instructions. When the computer program instruction is loaded and executed on a computer, the processes or functions described in accordance with embodiments of the present disclosure are generated in whole or in part. The computer can be a general purpose computer, a special purpose computer, a computer network, or other programmable device. The computer instruction can be stored in a computer readable storage medium or transmitted from one computer readable storage medium to another computer readable storage medium, for example, the computer instruction can be transmitted from a website site, computer, server or data center to another website site, computer, server, or data center via wire (for example, coaxial cable, fiber optic, Digital Subscriber Line (DSL)) or wireless (for example, infrared, wireless, microwave, etc.) manner. The computer readable storage medium can be any available medium that can be accessed by the computer or a data storage device such as a server, data center, and the like that includes one or more available mediums. The available medium may be a magnetic medium (for example, a floppy disk, a hard disk, a magnetic tape), an optical medium (for example, a Digital Video Disc (DVD)), or a semiconductor medium (for example, a Solid State Disk (SSD)) and the like.

The objects, technical solutions and advantage effects of the present disclosure have been further described in detail with reference to the above specific implementations. It should be understood that the above description is only the specific implementation of the embodiments of the present disclosure, and is not intended to limit the protection scope of the embodiments of the present disclosure. Any modifications, equivalent substitutions, improvements, etc., that are made based on the technical solutions of the embodiments of the present disclosure are intended to be included within the protection scope of the embodiments of the present disclosure.

What is claimed is:

1. A data indicating method, comprising:
    receiving, by a terminal, a downlink control signaling from a network side device, wherein the downlink control signaling comprises a first information domain and a second information domain, the first information domain is configured to indicate whether a transport block scheduled by the downlink control signaling is a new transport block, and the second information domain is configured to indicate a coding block group scheduled by the downlink control signaling; and
    determining, by the terminal, a number of coding block groups comprised in the new transport block according to the first information domain and the second information domain;
    wherein the determining, by the terminal, the number of the coding block groups comprised in the new transport block according to the first information domain and the second information domain, comprises:
    determining, by the terminal, that the transport block scheduled by the downlink control signaling is a new transport block according to the first information domain;
    determining, by the terminal, that values of first K bits in the second information domain are all a preset value, wherein K is a positive integer; and
    determining, by the terminal, the new transport block, wherein the number of the coding block groups comprised in the new transport block is K.

2. The method according to claim 1, wherein the second information domain indicates the coding block group scheduled by the downlink control signaling in a Bitmap manner.

3. The method according to claim 1, wherein after the determining, by the terminal, the number of the coding block groups comprised in the new transport block according to the first information domain and the second information domain, the method further comprises:

sending, by the terminal, acknowledgment (ACK) or non-acknowledgment (NACK) information for K bits of the new transport block to the network side device.

4. The method according to claim 1, wherein the first information domain is a new data indication (NDI) information domain.

5. The method according to claim 1, wherein the method further comprises:
    determining, by the terminal, that the transport block scheduled by the downlink control signaling is a new transport block according to the first information domain; and
    determining, by the terminal, that values of first K bits in the second information domain are not all a preset value or values of last K bits in the second information domain are not all the preset value, wherein K is a positive integer.

6. The method according to claim 5, wherein after the determining, by the terminal, that the values of the first K bits in the second information domain are not all the preset value or the values of the last K bits in the second information domain are not all the preset value, no ACK/NACK information for the new transport block is sent by the terminal to the network side device.

7. A terminal, comprising: a memory, a processor, and a computer program stored on the memory and operable on the processor,
    wherein the processor, when running the computer program, is configured to:
    control a communication interface to receive a downlink control signaling from a network side device, wherein the downlink control signaling comprises a first information domain and a second information domain, the first information domain is configured to indicate whether a transport block scheduled by the downlink control signaling is a new transport block, and the second information domain is configured to indicate a coding block group scheduled by the downlink control signaling; and
    determine a number of coding block groups comprised in the new transport block according to the first information domain and the second information domain;
    wherein the processor is configured to: determine that the transport block scheduled by the downlink control signaling is a new transport block according to the first information domain;
    determine that values of first K bits in the second information domain are all a preset value or values of last K bits in the second information domain are all the preset value, wherein K is a positive integer; and determine the new transport block, wherein the number of the coding block groups comprised in the new transport block is K.

8. The terminal according to claim 7, wherein the second information domain indicates the coding block group scheduled by the downlink control signaling in a Bitmap manner.

9. The terminal according to claim 7, wherein the processor is further configured to: control the communication interface to send acknowledgment (ACK) or non-acknowledgment (NACK) information for K bits of the new transport block to the network side device.

10. The terminal according to claim 7, wherein the first information domain is a new data indication (NDI) information domain.

11. The terminal according to claim 7, wherein the processor is further configured to: determine that the transport block scheduled by the downlink control signaling is a new transport block according to the first information domain; and determine that values of first K bits in the second information domain are not all a preset value or values of last K bits in the second information domain are not all the preset value, wherein K is a positive integer.

12. The terminal according to claim 11, wherein after the processor determines that the values of the first K bits in the second information domain are not all the preset value or the values of the last K bits in the second information domain are not all the preset value, no ACK/NACK information for the new transport block is sent by the terminal to the network side device.

13. A network side device, comprising: a memory, a processor, and a computer program stored on the memory and operable on the processor,
wherein the processor, when running the computer program, is configured to:
control a transceiver to send a downlink control signaling to a terminal, wherein the downlink control signaling comprises a first information domain and a second information domain, the first information domain is configured to indicate whether a transport block scheduled by the downlink control signaling is a new transport block, and the second information domain is configured to indicate a coding block group scheduled by the downlink control signaling; and
indicate a number of coding block groups comprised in the new transport block by the first information domain and the second information domain;
wherein the processor is configured to: indicate that the transport block scheduled by the downlink control signaling is a new transport block by the first information domain; indicate that values of first K bits in the second information domain are all a preset value or values of last K bits in the second information domain are all the preset value, wherein K is a positive integer; and indicate the new transport block, wherein the number of the coding block groups comprised in the new transport block is K.

14. The network side device according to claim 13, wherein the second information domain indicates the coding block group scheduled by the downlink control signaling in a Bitmap manner.

15. The network side device according to claim 13, wherein the processor is further configured to: control the transceiver to receive acknowledgment (ACK) or non-acknowledgment (NACK) information for K bits of the new transport block sent by the terminal.

16. The network side device according to claim 13, wherein the first information domain is a new data indication (NDI) information domain.

17. The network side device according to claim 13, wherein the processor is further configured to: indicate that the transport block scheduled by the downlink control signaling is a new transport block by the first information domain; and indicate that values of first K bits in the second information domain are not all a preset value or values of last K bits in the second information domain are not all the preset value, wherein K is a positive integer.

* * * * *